Nov. 2, 1965   J. E. HAAS   3,215,059
AIR CURTAIN APPARATUS
Filed May 23, 1963   2 Sheets-Sheet 1
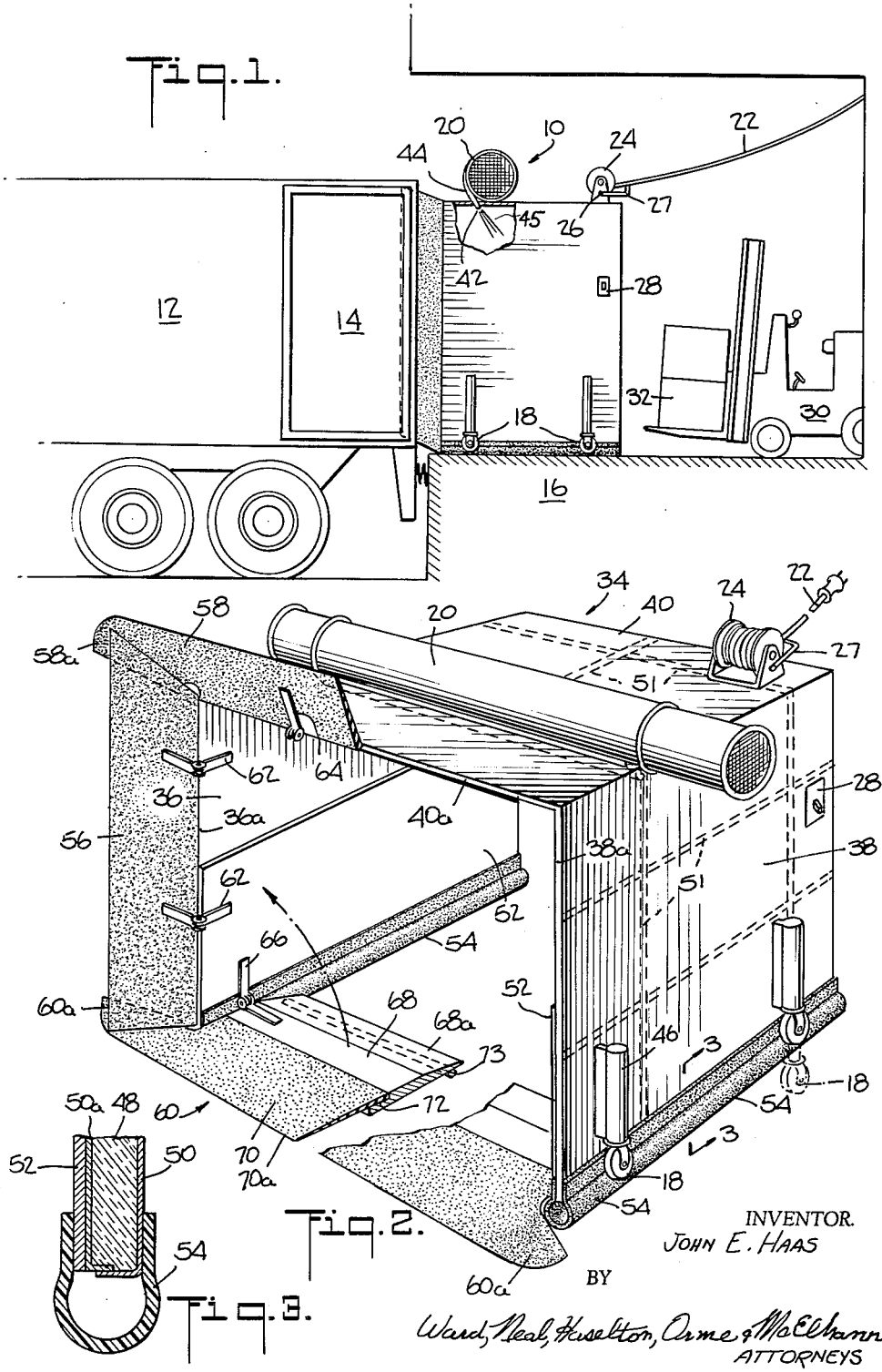
INVENTOR.
JOHN E. HAAS
BY
Ward, Neal, Haselton, Orme & McElhannon
ATTORNEYS

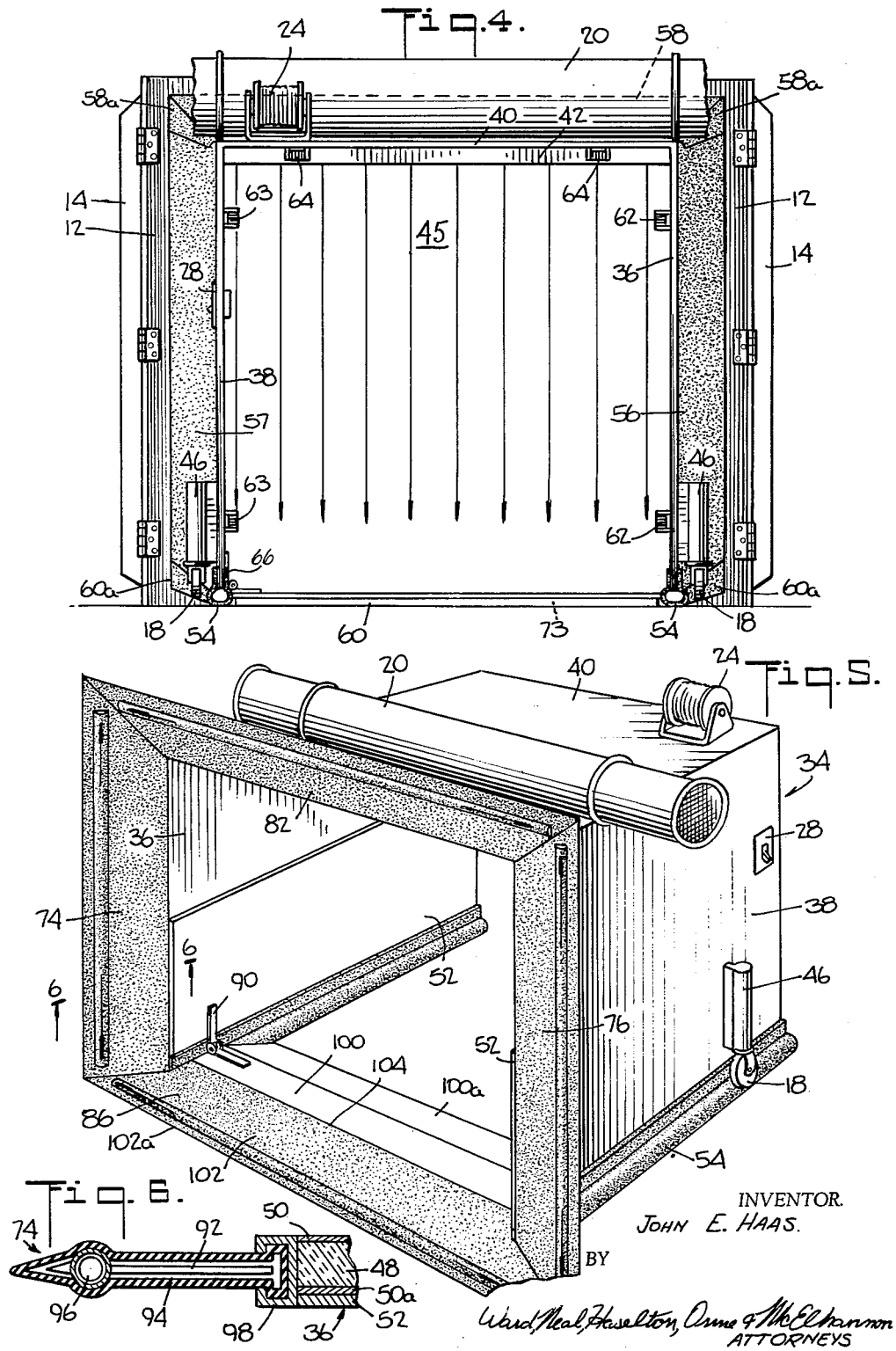

United States Patent Office 3,215,059
Patented Nov. 2, 1965

3,215,059
AIR CURTAIN APPARATUS
John E. Haas, 57 Sandra Circle, Westfield, N.J.
Filed May 23, 1963, Ser. No. 282,634
1 Claim. (Cl. 98—36)

This invention relates to transportation of frozen comestibles or the like and more particularly to apparatus for loading or discharging such commodities from refrigerated trailers or rail cars.

It is known to the art that low temperatures may be maintained within a refrigerated trailer or rail car regardless of the ambient temperatures of the surrounding environment during the loading or discharging of cargo with the use of an air curtain over the vehicle's opening.

However, prior art devices have encountered numerous problems and, therefore, they have not been utilized to the fullest extent possible. One of the limitations thereof has been the inability to transfer a unit from one vehicle to another as desired. Thus, each vehicle was required to supply their own air curtain unit and the resulting cost thereof was excessive. Hence, one of the features of applicant's air curtain unit is the provision of adaptable means for connecting same to vehicles of various sizes.

Also, the use of prior art devices has been limited because of the failure to provide a shield for the air curtain from outside drafts. That is, the flow of outside air has been allowed to penetrate the air curtain and thereby reduce the effectiveness thereof.

Moreover, applicant has found that by insulating the walls a considerable amount of heat flow is prevented through the sides and top of the apparatus. Thus, the frozen foods or like commodities contained in the refrigerator trailers or rail cars are maintained at the desired temperature level regardless of the surrounding temperatures during such operation.

Further, applicant has found that it is desirable to utilize such apparatus in conjunction with pallets and fork lift trucks and, therefore, such units should be rigidly constructed and durable for such use. That is, the apparatus must be simple of design, economical to manufacture and, also, durable of construction.

Furthermore, applicant has found that such an apparatus must be adaptable to fit the majority of different sized refrigerated trailers while still maintaining a tight seal between such apparatus and said trailer. That is, an air tight joint or seal must be simply obtained and readily maintained between the trailer and the apparatus in order to sustain the refrigerated trailer at its desirable temperature level during the loading or discharging operation. Moreover, the apparatus must co-operate with the loading platform to form a seal therebetween. Thus, the apparatus must also make a removable joint with the loading platform in order to prevent the heat transfer thereby.

In view of the foregoing, this invention contemplates the provision of an air curtain apparatus comprising an elongated inverted U-shaped frame member having resiliently mounted flippers at one end thereof for forming a seal with a refrigerated trailer or rail car. Alternatively, telescopic sealing means in cooperation with telescopic rods may be employed in lieu of said flippers. An air blower is mounted on the top of the frame, the latter being slotted at the proper area for the nozzle of the air blower in order to form an air curtain over the opening of the refrigerated trailer or rail car. Retractable means mounting the frame for moving said apparatus from a first vehicle to a second vehicle are provided.

There has thus been outlined rather broadly the most important features of the present invention in order that the detailed description thereof that follows may be better understood and in order that the present contribution to the art may be better appreciated. There are, of course, additional features of the invention that will be described hereafter and which will form the subject of the claim appended hereto. Those skilled in the art will appreciate that the conception on which the present disclosure is based may readily be utilized as a basis for designing other structures for carrying out the several purposes of this invention. It is important, therefore, that the claim be regarded as including such equivalent constructions as do not depart from the concept and scope of this invention.

Several embodiments of the invention have been chosen for purposes of illustration and description and are shown in the accompanying drawings, forming a part of the specification, wherein:

FIG. 1 is a side elevation showing a mobile air curtain unit secured to the rear portions of a refrigerated trailer and a fork lift truck carrying articles therethrough;

FIG. 2 is a perspective view of an air curtain unit constructed in accordance with the concepts of this invention;

FIG. 3 is a sectional view taken along line 3—3 of FIG. 2;

FIG. 4 is an end view of an air curtain unit;

FIG. 5 is a perspective view of a second embodiment of an air curtain unit constructed in accordance with the concepts of this invention; and FIG. 6 is a sectional view taken along line 6—6 of FIG. 5.

Referring now to the drawings in more detail, FIG. 1 shows an air curtain unit designated generally at 10 positioned adjacent the rear portion of a refrigerated rail car or trailer 12, the rear door 14 thereof being in the open position as shown. It will be appreciated that this air curtain unit is adapted to fit or engage a plurality of refrigerated trailers having various dimensions. That is, the air curtain unit is adjustable so that it can be utilized with a large number of different trailers without additional modifications.

The air curtain unit 10 is shown in FIG. 1 positioned upon loading platform 16 and the wheels or casters 18 have been retracted in order that the base of the unit can rest directly upon the loading platform. That is, the base of the air curtain unit coacts with the loading platform to form a seal therebetween as will be discussed more fully hereinafter. An air blower 20 is mounted on the top of the air curtain unit 10 and positioned outwardly of the refrigerated trailer opening. Power for the air blower 20 is transmitted from the warehouse current through a power line 22 which is provided with a reel or spool 24 and a bracket 26 which coact to conveniently store the excess cable. The spool 24 is provided with internal tension means (not shown) which tend to retract the cable and wind same upon the spool. The bracket 26 supports a pivotally mounted snubber and tripping lever 27, the snubber for holding the power cable at the desired extended length and the tripping lever for releasing the snubber to allow the internal tension means of the spool 24 to recoil the cable 22. Thus, when the operator desires to utilize the house current he must pull the cable 22 off the reel against a slight tension. When the cable is unwound to its desired length the snubber 27 engages the cable overcoming the tension in the spool 24 and holds the cable at the proper extended length. To rewind the cable it is given a short jerking motion which trips the snubber 27 and allows the spool to rewind the extended cable thereon. A simple on-off switch 28 is provided for activating the air blower, as desired.

It is to be pointed out that the air blower 20 mounted on top of the air curtain unit 10 is positioned a distance from the rear of the trailer in order to extend the refrigerated area for facilitating the loading or unloading operation. That is, additional working space is provided for unloading the first few pallet loads, or for loading the last few pallet loads.

A fork lift truck 30 rides on the loading platform 16 and is shown in FIG. 1 carrying cartons 32 which are to be moved through the air curtain unit 10 and loaded in the refrigerated trailer 12.

The mobile air curtain unit 10 comprises an elongated inverted U-shaped frame designated generally at 34 having a pair of sides 36 and 38 as well as a top 40. The air blower 20 is mounted on the top 40 adjacent a slotted portion 42 which receives nozzle 44 of the blower. The blower 20 through nozzle 44 directs a layer or curtain 45 of air transversely of the air curtain unit 10 as shown in FIGS. 1 and 4. Such curtain 45 extends completely across the opening from one side 36 to the other side 38 and preferably is inclined slightly from the vertical. Thus, warm air is prevented from entering the refrigerated area even though the trailer's doors may remain open for prolonged periods of time. Further, the curtain allows men and commodities to pass therethrough and hence the opening and closing of heavy doors is eliminated.

The four corners of the mobile air curtain unit are provided with brackets 46 which support wheels or casters 18. The casters 18 are mounted in such a manner that when the unit is not in use they are lowered in order to facilitate the movement of the unit from one installation to another. Brackets 46 contain suitable means for raising and lowering the casters 18, which means may be hydraulic, mechanical or electrical, for example. After the unit has been placed in position, the casters are retracted and the bottom portion of the side panels rest upon the floor or loading platform for insulating purposes.

The top 40 and the side panels 36 and 38 are preferably manufactured of lightweight material which may comprise, for example, a laminated construction as shown in FIG. 3 having a central insulating or fiberglass portion 48 encased in aluminum sheeting 50 and 50a. Structural reinforcing members 51 of aluminum or the like may be provided in the top 40 and side panels 36 and 38, if desired. A protective panel 52 of plywood or the like material may be fitted half-way up from the bottom on the inside of the unit in order to protect the side walls 36 and 38 from the abuse of the sharp edges of pallets or the fingers of fork lift trucks.

The bottom edges of the sides 36 and 38 are each encased in an arcuate resilient member or gasket 54, preferably manufactured from heavy rubber or the like in order to provide an effective seal between the air curtain unit and the supporting floor or loading dock therefor. Thus, member 54 provides a sealing gasket which preferably extends the entire length of the side of the unit and insures a tight seal with the loading platform when the unit is in operation.

One end of the air curtain unit is provided with a pair of side flippers 56 and 57 depending from the sides 36 and 38, respectively, a top flipper 58, and a bottom flipper 60. Such flippers are manufactured from resilient material and are intended to act as flexible seals between the air curtain unit and the refrigerated trailer walls. Preferably said flippers are manufactured from a rubber-like material known to provide an effective air tight seal between the unit and the refrigerated trailer or rail car. The side flippers 56 are adapted to pivot along the entire length of the corresponding edges 36a and 38a of the sides 36 and 38, respectively, so that cold air seepage is prevented. The top flipper 58 is adapted to pivot along the entire length of the correspondnig edge 40a of the top 40 for the same purposes. Each end of the top flipper 58 is provided with an overlap portion 58a which is adapted to snugly engage the corresponding edge of the side flippers 56 in sealed relationship thereto for preventing the passage of cold air therebetween. Each end of the bottom flipper 60 is provided with an overlap portion 60a which is adapted to snugly engage the corresponding edge of the side flippers 56 in sealed relationship for the same purposes. Each side flipper 56 and the top flipper 58 is provided with spring-loaded hinges 62, 63 and 64 which are mounted on the side walls and top, respectively, for the purpose of urging said flippers outwardly to provide contact pressure between such flippers and the adjacent trailer.

The bottom flipper 60 is hingedly connected to one of the side walls which may be side wall 36 by means of hinge 66, for example. The bottom flipper 60 comprises a reinforcing portion 68 which is manufactured from steel or the like and a sealing portion 70 which is of resilient material such as heavy rubber, for example. The common edge 72 between the two portions 68 and 70 is notched in order to form a smooth, sealed joint therebetween. The outer edges 68a and 70a of the flipper 60 are tapered so that the fork lift truck 30 may pass smoothly thereover while loading or discharging articles from the refrigerated trailer. Embedded in the reinforcing portion 68 of the flipper 60 is a tubular rubber gasket 73 which extends the entire length of the portion 68 and provides an effective seal with the supporting floor or loading dock. It should be understood that the flipper 60 may be folded upwardly against the side wall 36 when the unit is being moved from one location to another.

FIGS. 5 and 6 illustrate a second embodiment of an air curtain unit constructed in accordance with the concept of the invention. In lieu of the flippers 56, 57, 58 and 60 heretofore described, telescopic seals and telescopic rods are provided. Thus, the two side walls 36 and 38 are provided with telescopic seals 74 and 76, respectively. The top wall 40 of the frame 34 is also provided with a telescopic seal 82 and the bottom of the air curtain unit is provided with a telescopic seal 86 which is hingedly connected to the side 36 at 90. FIG. 6 is a sectional view taken along line 6—6 of FIG. 5 and shows the construction of the telescopic seal 74. The other telescopic seals including 76, 82 and 86 are constructed in a similar manner and perform a similar function as telescopic seal 74 about to be described. The seal 74 comprises a T-shaped reinforcing member 92 which is encompassed by a resilient sealing member 94. Said sealing member is manufactured from rubber-like material in order to form an effective seal with the refrigerated trailer. A telescopic rod 96 extends to the extremities of the door sill of the refrigerated trailer in order to assure an effective seal between such sill and the adjacent sealing member 94. That is, in essence, each of the seals 74, 76, 82 and 86 comprises a large mass of rubber-like material which is resilient and may be linearly stretched, rigid transverse reinforcing members, and a longitudinally extending telescopic pole or rod which is embedded within the rubber-like mass. The telescopic rod is adapted to resiliently move outwardly and since it is embedded within the resilient rubber material it stretches the rubber material longitudinally. Hence, such a sealing structure stretches linearly to fit within the frame of various sized openings. A resilent coupling member 98 is provided in order to couple the side member 36 to the telescopic seal 74. Thus, it will be appreciated that the telescopic seals tend to move outwardly as indicated by the arrows in FIG. 5 in order to form an effective seal with the refrigerated trailer 12.

The bottom telescopic seal 86 comprises a reinforcing portion 100 which is manufactured from steel or the like and a sealing portion 102 which is of resilient material such as heavy rubber, for example. The common edge 104 between the portions 100 and 102 is notched in order to form a smooth, sealed joint therebetween. The outer edges 100a and 102a of the telescopic seal 86 are tapered so that the fork lift truck 30 may pass smoothly thereover while loading or discharging articles from the refrigerated trailer.

In operation, the refrigerated trailer 12 is backed up against the loading platform 16 where the doors 14 of the trailer are opened wide. The mobile air curtain unit 10 is pushed partially within the opened doors at the rear of the refrigerated trailer. The wheels 18 of the air curtain unit 10 are then retracted in order that the sealer gasket 54 will form a joint with the loading dock or platform 16 thereunder. The end of the air curtain unit adjacent the trailer truck is adapted to form a seal with the inside walls of the trailer by the embodiment illustrated in FIG. 2 or the embodiment illustrated in FIG. 5. A power line 22 is connected with the warehouse current and the switch 28 actuates the air blower 20. It will be appreciated that the position of the air blower on the top 40 of the unit 10 is such that the refrigerated portion of the trailer is actually extended outwardly beyond the rear of the trailer itself and, thus, additional working space is provided in the required low temperature zone for unloading the first few pallet loads or loading the last few pallet loads.

Thus, a portable air curtain unit has been disclosed which will insure the maintenance of low temperatures of the frozen commodities during the loading and unloading of refrigerated vehicles. Hence, the amount of time the frozen commodities would not be in a refrigerated zone is reduced to the actual movement of the commodity by the pallet moving equipment, i.e., from the outside of the air curtain to the cold storage room in the warehouse or vice versa.

What is claimed and desired to be secured by Letters Patent is:

A mobile air curtain comprising an elongated housing having a top and side walls, resiliently hinged flipper-like seals comprising flat elongated resilient members extending along the top, bottom and side walls, means for pivotally mounting and for urging the seal members towards the edges of the housing facing a vehicle, a nozzle mounted in a slot in the top wall of said housing extending across the full width of the housing and directing an air curtain downwardly towards the free end of said housing, said flippers being adapted for outward movement for forming a seal with a refrigerated vehicle, a sealer gasket positioned along the bottom of the sides of said housing forming a seal with a loading platform, and wheel means mounted on said housing for moving said unit from a first location to a second location.

References Cited by the Examiner

UNITED STATES PATENTS

| | | | |
|---|---|---|---|
| 2,420,520 | 5/47 | Carsey | 98—115 |
| 2,778,206 | 1/57 | Wilson | 62—237 |
| 3,115,818 | 12/63 | Smith | 98—36 |
| 3,157,105 | 11/64 | Tamm | 98—36 |

FOREIGN PATENTS 567,039   9/57   Italy.

ROBERT A. O'LEARY, *Primary Examiner.*